US007753630B2

(12) United States Patent
Jeppsson

(10) Patent No.: US 7,753,630 B2
(45) Date of Patent: Jul. 13, 2010

(54) BASE UNIT AND SYSTEM FOR DOCKING AND SECURING A WHEELCHAIR IN A VEHICLE

(75) Inventor: Rolf Jeppsson, Sundsbruk (SE)

(73) Assignee: Permobil AB, Tirma (SE)

( * ) Notice: Subject to any disclaimer, the term of this patent is extended or adjusted under 35 U.S.C. 154(b) by 755 days.

(21) Appl. No.: 11/538,742

(22) Filed: Oct. 4, 2006

(65) Prior Publication Data

US 2007/0154275 A1 Jul. 5, 2007

(30) Foreign Application Priority Data

Oct. 13, 2005 (SE) .................................. 0502266

(51) Int. Cl.
*B60P 7/08* (2006.01)

(52) U.S. Cl. .............................................. 410/7; 410/4

(58) Field of Classification Search ..................... 410/7, 410/9, 19, 4, 80, 51; 297/DIG. 4; 296/65.04; 280/304.1; 248/503, 503.1
See application file for complete search history.

(56) References Cited

U.S. PATENT DOCUMENTS 4,690,364 A 9/1987 Constantin
4,973,022 A 11/1990 Mayland
5,466,111 A 11/1995 Meyer
6,231,283 B1 * 5/2001 Stowers ........................ 410/9

FOREIGN PATENT DOCUMENTS

EP 0102838 2/1983

OTHER PUBLICATIONS

EPO Communication—Jul. 23, 2007.

* cited by examiner

*Primary Examiner*—Stephen Gordon
(74) *Attorney, Agent, or Firm*—Holland & Hart LLP

(57) ABSTRACT

Base unit (2) for docking and securing a wheelchair (1) in a vehicle, which base unit is designed to be fixed to the floor of the vehicle and comprises a locking mechanism (11) for securing an engaging device (3) fixed to the wheelchair in such a way that it can be released. In order to achieve a butt fixing of the wheelchair, the base unit comprises at least one first support surface (20), facing away from the floor of the vehicle, that is arranged to make contact with a corresponding first support surface on the wheelchair in order to prevent the wheelchair from moving in the direction towards the floor of the vehicle when in the secured position.

11 Claims, 6 Drawing Sheets

BASE UNIT AND SYSTEM FOR DOCKING AND SECURING A WHEELCHAIR IN A VEHICLE

TECHNICAL FIELD

The invention relates to a base unit for docking and securing a wheelchair in a vehicle. The invention also relates to a system comprising such a base unit.

The base unit can be used to make it possible to dock and secure wheelchairs at a driver's position or passenger's positions in a vehicle and can be mounted in the vehicle during manufacture or as a retrofit.

BACKGROUND ART

In order to make it possible for persons in wheelchairs to be passengers or drivers in vehicles, for example in so-called minibuses, docking systems are sometimes used. The purpose of the docking systems is to secure the wheelchair in the vehicle. The systems normally comprise a base unit that is mounted on the floor of the vehicle at the location of the driver's seat or any one of the passenger seats, after the ordinary seat has been removed from this location. The systems also comprise an engaging device that is mounted on the wheelchair. When the wheelchair is to be secured in the intended location, the wheelchair is driven into the vehicle and up to the base unit. The docking is normally thereafter achieved by the wheelchair being driven further forward so that a part of the chassis of the wheelchair is located over the base unit, whereupon the engaging device that projects downwards from the wheelchair engages with a locking mechanism in the base unit.

For reasons associated with road safety, it is of course of the greatest importance that these docking systems achieve a secure fixing of the wheelchair. This means that the fixing must be strong, so that the very large forces on the wheelchair that can arise in the event of a collision are unable to break the fixing and cause the wheelchair to become loose. In addition, the fixing should be a butt contact, that is, it should permit as little relative movement as possible between the wheelchair and the vehicle. The greater such relative movement that is possible, the greater the risk that the person in the wheelchair will hit the steering wheel, for example, or some other part of the vehicle in the event of a collision. In addition, with such a relative movement, there would be a risk of a recoil immediately after the moment of impact, that could cause serious injury to the person in the wheelchair. In addition, the large moving mass of the combined weight of the wheelchair and the person that would arise in the event of such a relative movement would cause an additional load on the engaging parts of the docking system, which could result in the fixing being broken.

An additional desirable characteristic of the docking systems is that the wheelchair's clearance above the ground should not be affected adversely when the wheelchair is to be used normally outside the vehicle. It is generally recognized that a good clearance is of the greatest importance for giving the person in the wheelchair good freedom of movement in both rural and urban environments. With previously-known docking systems, the engaging devices on the wheelchair often consist of an engaging nose or the like that is attached in such a way that it projects downwards from the chassis of the wheelchair, which reduces the clearance considerably and as a result restricts access to some locations.

Previously-Known Technology

U.S. Pat. No. 4,690,364 describes a device for securing a wheelchair in a vehicle. The device comprises a base unit that is fixed to the floor of the vehicle and that has a locking mechanism. The device also comprises an engaging nose that is attached to a wheelchair by means of a framework in such a way that it does not move. When the framework is screwed onto the chassis of the wheelchair, the engaging nose projects downwards in order to be able to engage with the locking mechanism in the base unit.

When the wheelchair has been docked, the total weight of the wheelchair and of the person who is sitting in the wheelchair is supported by the wheels of the wheelchair. As at least two of the wheels are provided with pneumatic tyres in order to provide a comfortable ride, this means that, in the docked position, the wheelchair is able to move slightly in relation to the base unit and the vehicle. This relative movement corresponds to the cushioning effect of the pneumatic tyres. With the device described in U.S. Pat. No. 4,690,364, a butt fixing is thus not achieved, which results in the problems described above.

Modern wheelchairs, for example electrically-operated wheelchairs for use outdoors, often have a considerably more sophisticated suspension system with link arms and gas springs or the like. Such a modern wheelchair suspension system has a greater cushioning effect, that is, it allows a larger movement of the seat of the wheelchair in relation to the surface upon which the wheelchair is standing, than that provided by pneumatic tyres alone. Accordingly, the above-mentioned problems are made worse if the device described in U.S. Pat. No. 4,690,364 is used for securing modern wheelchairs.

Yet another problem with the device described in U.S. Pat. No. 4,690,364 is that the engaging nose that projects downwards and that is permanently attached to the wheelchair reduces the wheelchair's clearance considerably. There is thus a risk of the projecting nose hitting the surface upon which the wheelchair is travelling, both when moving indoors and outdoors and when travelling in both a rural and an urban environment. As a result, the freedom of movement that is provided to the person in the wheelchair is, of course, restricted.

DISCLOSURE OF INVENTION

An object of the present invention is therefore to provide a base unit for docking and securing a wheelchair in a vehicle, which base unit contributes to increased safety for the user of the wheelchair when the wheelchair is secured in the vehicle.

Another object is to provide such a base unit that contributes to achieving a butt fixing of the wheelchair in the vehicle.

Yet another object is to provide such a base unit that is simple to use and that enables docking and disconnection to be carried out in a simple way.

Yet another object is to provide such a base unit that has a simple construction and is strong and resistant to wear.

These and other objects are achieved by a base unit of the type described in the introductory part of claim 1, that has the special technical features described in the characterizing part of the claim. Due to the first support surface arranged on the base unit, which in the docked position supports the wheelchair by making contact with a corresponding first support surface on the wheelchair, the wheelchair's suspension is unloaded and movement of the wheelchair downwards in relation to the vehicle is prevented, whereby the above-mentioned problems that are associated with such relative movement are reduced.

By arranging a second support surface on the base unit, that faces in the opposite direction to the first support surface and that, by making contact, interacts with a corresponding second support surface on the engaging device, a relative movement is also prevented in an upward direction. By this means, the wheelchair is essentially completely butt-fixed in the vertical direction.

The invention also relates to a system for docking and securing of a wheelchair in a vehicle.

Other characteristics and advantages of the base unit and the system are apparent from the subsidiary claims and from the following description.

BRIEF DESCRIPTION OF DRAWINGS

Exemplifying embodiments of the invention are described in the following, with reference to the figures, in which.

MODES FOR CARRYING OUT THE INVENTION

Figure 1A:
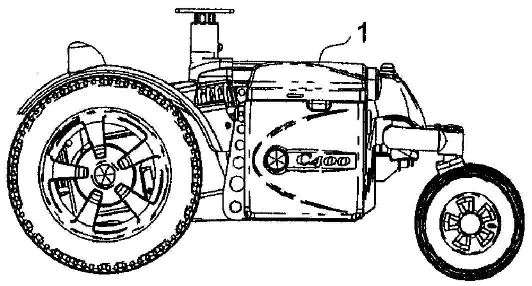
FIGS. 1*a*-1*c* are side views that show a wheelchair in different positions during docking.
Figure 1B:
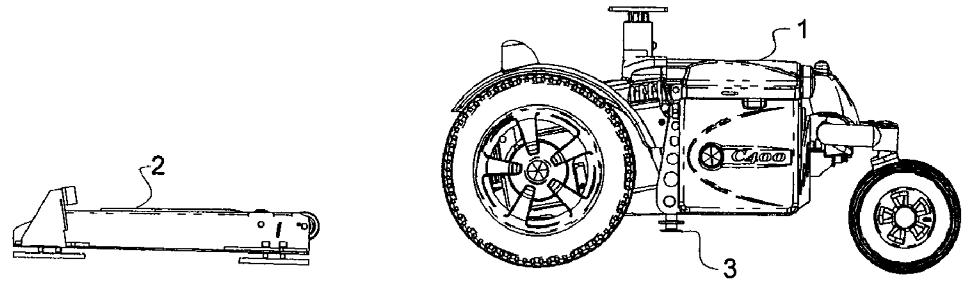
Figure 1C:
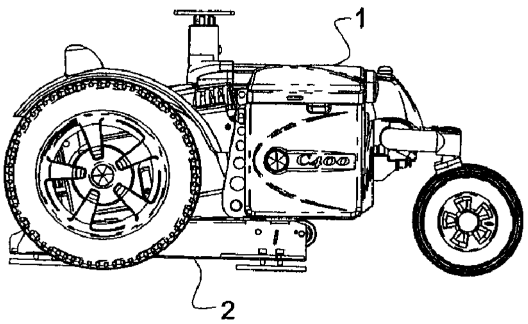
Figure 2:
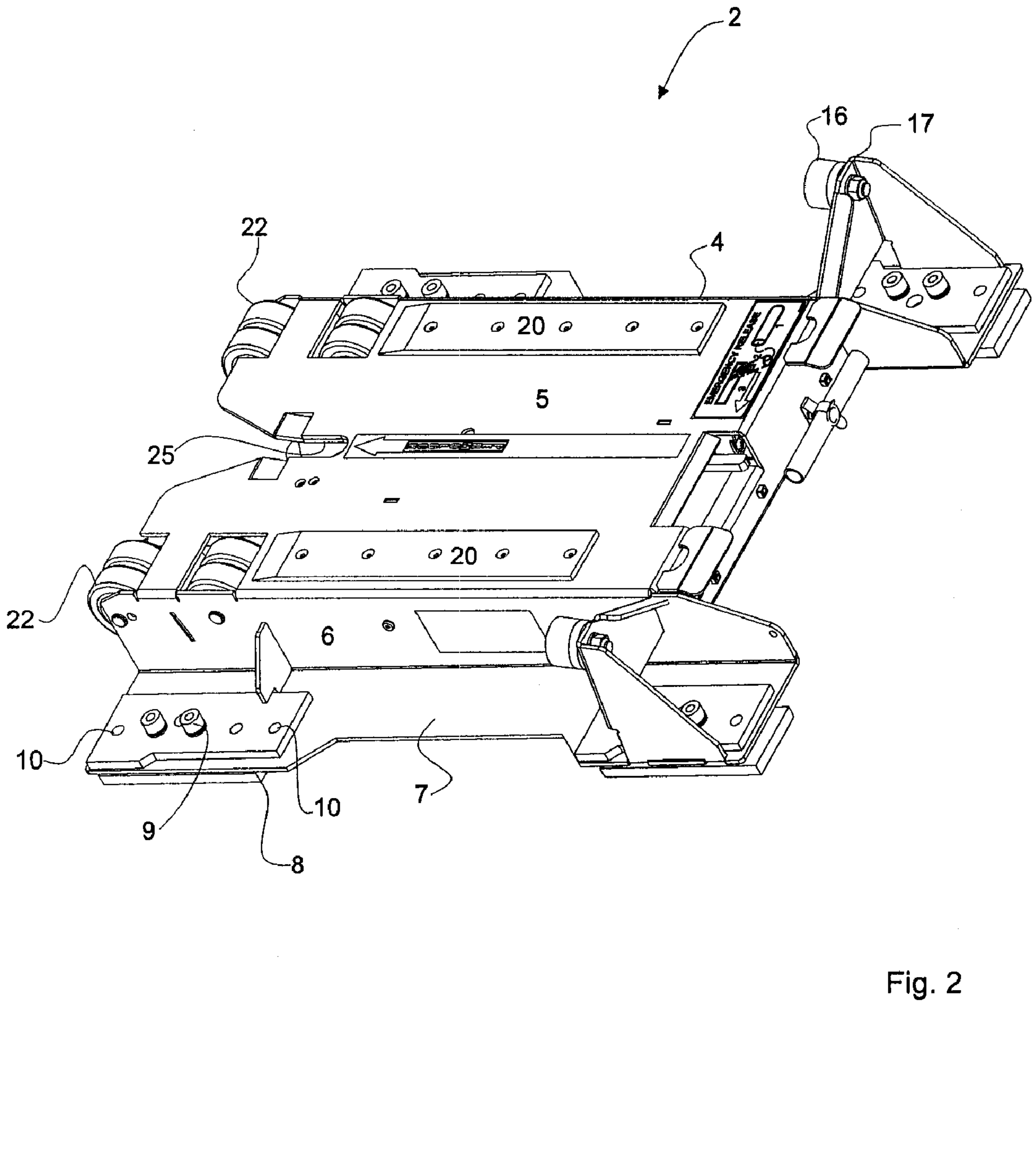
FIG. 2 is a perspective view of a base unit from obliquely above.
Figure 3:
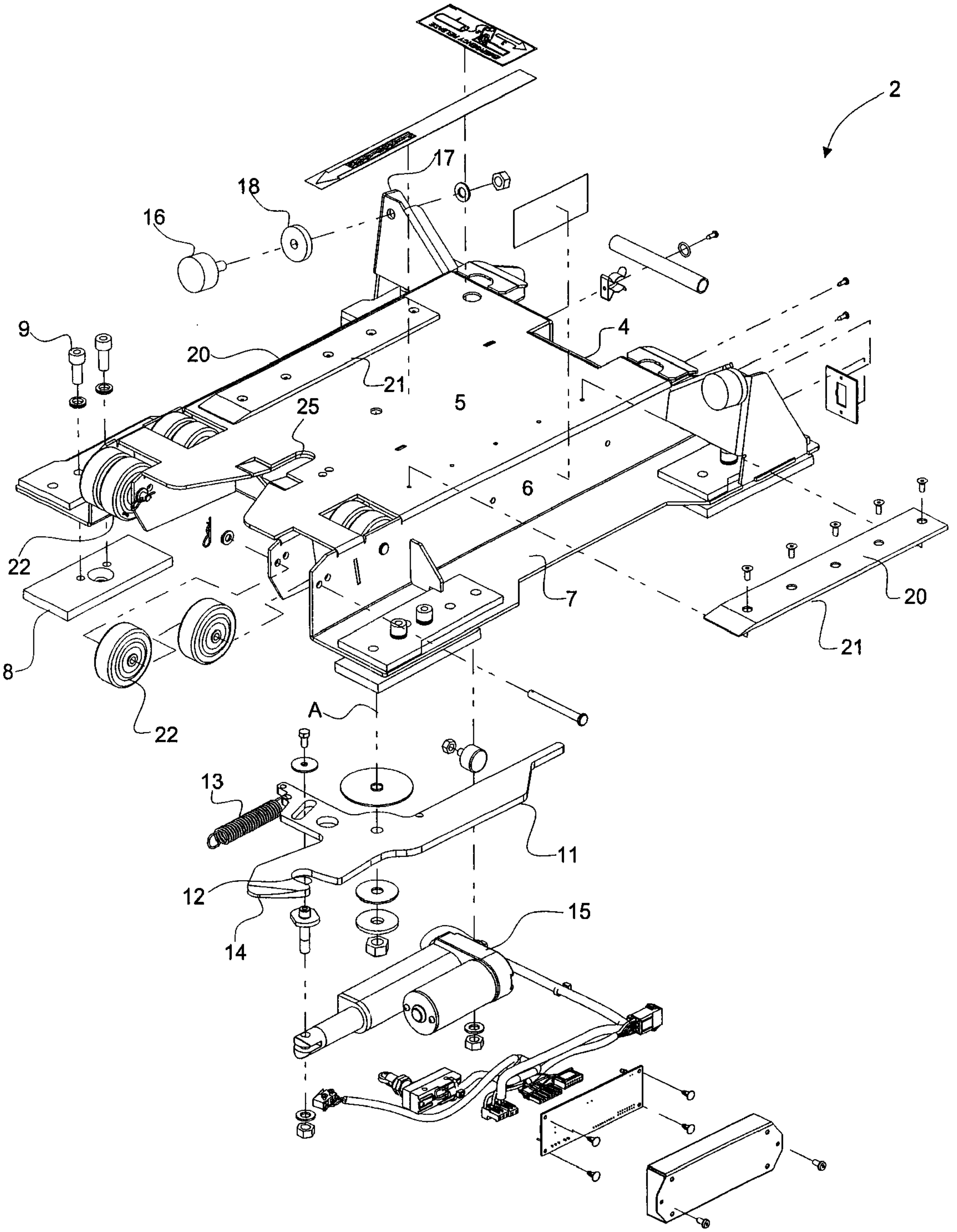
FIG. 3 is an exploded diagram of the base unit illustrated in FIG. 2.
Figure 5:
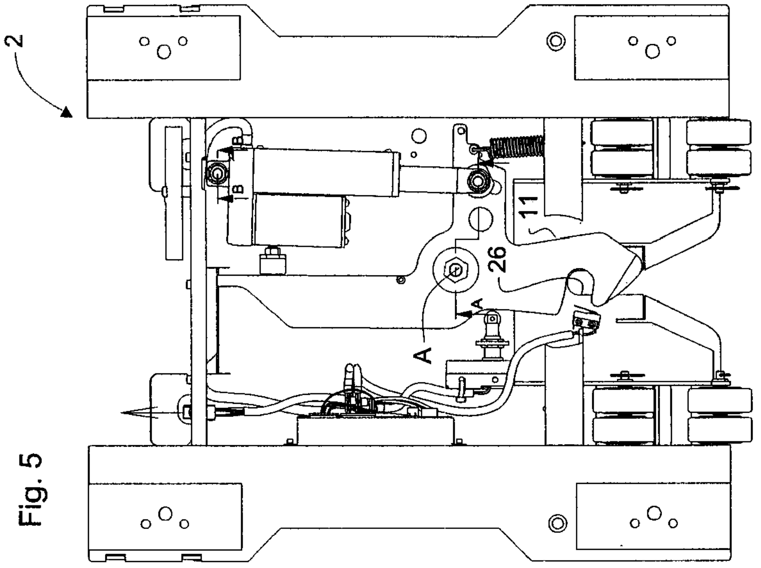
FIGS. 4, 5 and 6 are plan views from above, below and from the side respectively, of the base unit illustrated in FIG. 2.
Figure 6:
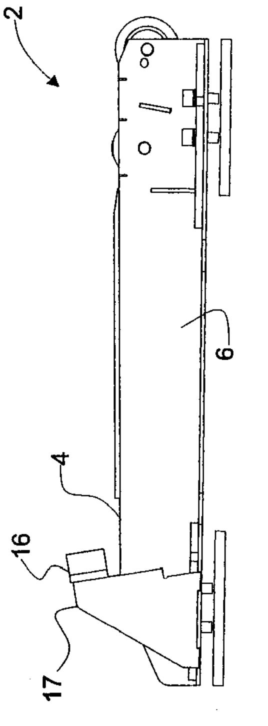
Figure 4:
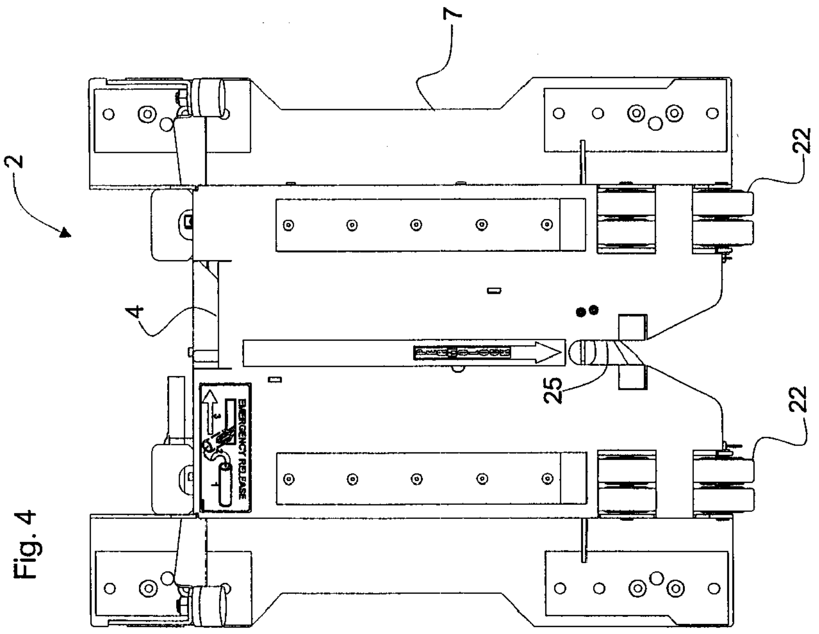
Figure 7:
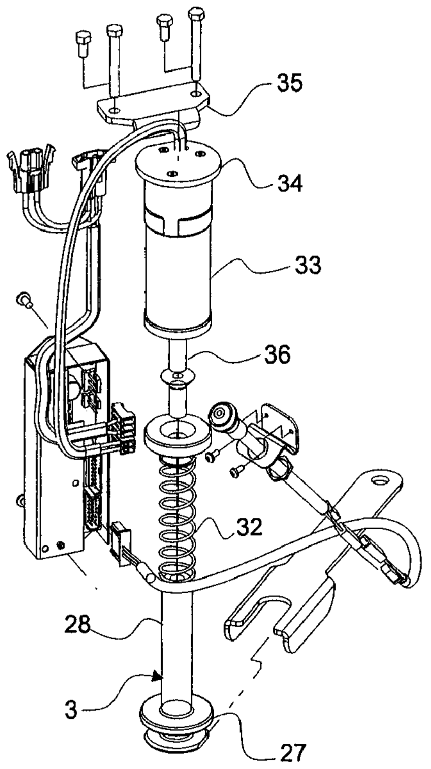
FIG. 7 is a perspective view of an engaging device for mounting on a wheelchair and also shows an electrical operating device and associated control unit and cabling.

FIG. 1*a* shows a wheelchair 1 in normal use. The seat of the wheelchair has been omitted in the figures for increased clarity. As shown in the figure, the wheelchair has normal clearance without parts projecting down from the chassis. In this position, the wheelchair thus fulfils international requirements concerning clearance above ground level. FIG. 1*b* shows the wheelchair when it is moving towards a base unit 2 comprised in a system for docking the wheelchair in a vehicle. As shown by FIG. 1*b*, in this position, a moveable engaging device 3 that is fixed to the wheelchair 1 has projected out from the underside of the chassis. FIG. 1*c* shows how the wheelchair 1 has assumed a docked position on the base unit 2.

The base unit is described below in greater detail with reference to FIGS. 2-6. The base unit 2 comprises a casing 4 of relatively strong folded steel plate. The casing 4 comprises an upper wall 5 and side walls 6 to which base plates 7 are attached. The base unit also comprises four mounting plates 8 that have bolt holes for rigid fixing of the mounting plates to a floor of a vehicle. In the mounted position, the base unit 2 is fixed to the mounting plates 8 by fixing bolts 9. Adjustment of the position of the base unit 2 in the longitudinal direction is made possible by the base plates having a number of fixing holes 10 arranged in a row in the longitudinal direction.

In addition, a locking mechanism is included and fixed in the casing. The locking mechanism comprises a hook device 11 that can rotate around a vertical axis A, which hook device has a hook 12 for engaging with the engaging device 3 on the wheelchair. The hook device 11 is self-locking and has a spring 13 that urges the hook device towards its locked position. The tip 14 of the hook is angled in order to enable the engaging device 3 to rotate the hook device 11 from its locked position assumed by the spring 13, when it is inserted temporarily into the base unit, so that it can thereafter engage with the hook 12. The shape of the hook 12 is, however, designed to prevent the engaging device 3 being pushed out of its engagement with the hook. In order to release the engagement between the hook and the engaging device, an electrically-operated actuator 15 is connected to the hook device 11. The base unit 2 also comprises a mechanism (not shown) for manually releasing the engagement between the engaging device and the hook, for example in the event of a loss of power.

The shape of the hook 12 is, in addition, such that, when it is in engagement with the engaging device 3, it is a close fit around the engaging device 3 in order to prevent relative movement in the horizontal plane between the hook and the engaging device. By this means, a butt fixing of the wheelchair is thus achieved in directions that are parallel to the floor of the vehicle. In order to ensure still further that the wheelchair does not move forwards in the longitudinal direction, for example in the event of a collision, two buffers 16 are fixed to brackets 17 projecting from the casing, above the base plates 7. In the locked position, the buffers 16 are in contact with the chassis of the wheelchair. For adaptation to suit different chassis, the buffers 16 are fixed to the brackets 17 with intermediate replaceable spacers 18. By selecting spacers 18 of a thickness to suit the chassis, the position of the buffers 16 can be adjusted so that the wheelchair's engaging device 3 is in the correct position in the longitudinal direction for engagement with the hook 12, when the chassis is in contact with the buffers 16.

The base unit 2 also comprises two first support surfaces 20 facing away from the floor of the vehicle. In the example shown, these first support surfaces 20 are arranged on facing plates 21 that are screwed onto the top side of the upper wall 5. The facing plates 21 consist of a hard-wearing material, for example a polymer material. In addition, the facing plates 21 are replaceable, in order to provide a simple way of avoiding having to use a damaged support surface 20. The first support surfaces 20 are arranged to be in contact with corresponding first support surfaces that are arranged on the chassis of the wheelchair. In the example described here, these corresponding first support surfaces are arranged on link arms (not shown) comprised in the chassis. In addition, in the example, the first support surfaces of the base units are arranged at a height above the floor of the vehicle that is somewhat greater than the height above the floor of the corresponding first support surfaces arranged on the chassis. For the docking, the chassis must thus be raised slightly to enable the first support surfaces of the chassis to make contact with the first support surfaces 20 of the base unit 2. For this purpose, lifting devices are arranged on the base unit 2. These lifting devices comprise a first set of rollers 22.

When the wheelchair is moved towards the base unit for docking, the first support surfaces of the wheelchair come into contact with the rollers 22 slightly below the first support surfaces 20 of the base unit and the highest point of the rollers 22. When the wheelchair is moved further forward, the first support surfaces of the wheelchair roll up on the rollers 22, with the result that the first support surfaces of the wheelchair are on a level with or slightly above the first support surfaces 20 of the base unit. The wheelchair can thereafter be moved still further forward, whereby the first support surfaces of the wheelchair come into contact with the first support surfaces 20 of the base unit. When the engaging device 3 has engaged with the hook 12 and the chassis has come into contact with the buffers 16, the wheelchair has assumed the correct secured docking position.

As the lifting devices raise the wheelchair slightly, this has the result that the wheelchair's suspension is unloaded and, in this position, at least a part of the weight of the wheelchair is supported by the base unit. As the wheelchair is in contact with the first support surfaces of the base unit that are on the strong casing, the wheelchair is prevented from moving downwards towards the floor of the vehicle or from tipping forward, even if very strong downward forces should arise between the first support surfaces of the base unit and the interacting first support surfaces of the wheelchair, for example in the event of a collision while the vehicle is being driven forward.

Figure 8A:
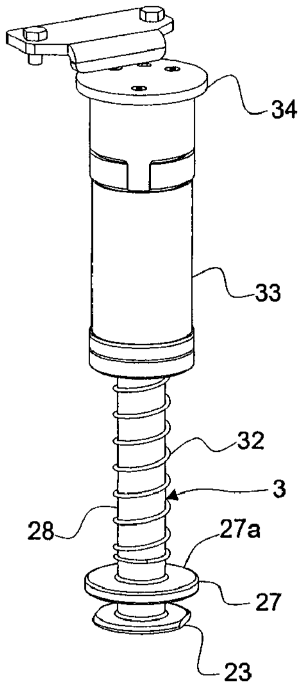
FIGS. 8*a* and 8*b* are perspective views of the engaging device shown in FIG. 7 with operating device, and show the engaging device in a withdrawn passive position and in a projecting active position respectively.
Figure 8B:
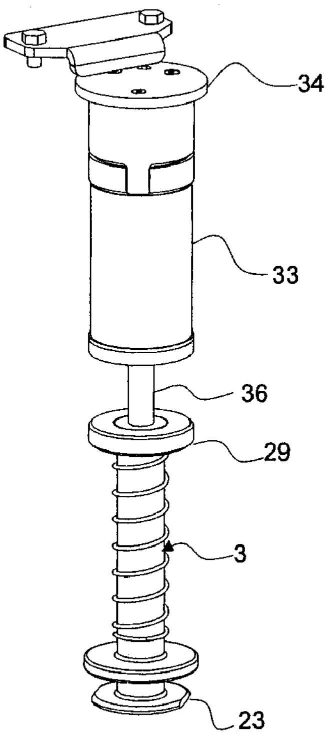

The upper wall 4 of the base unit 2 has, in addition, a longitudinal slot or opening 25. The slot 25 is open in the backward direction to enable the engaging device to be inserted into the slot when the wheelchair is moved forward in order to cause the engaging device 3 to engage with the hook 12. A second support surface 26 on the base unit (see FIG. 5) is arranged around the slot 25 on the underside of the upper wall 4. In the example illustrated, this second support surface 26 consists of the downward-facing side of the upper wall 4, around the slot 25. This second support surface 26 forms a contact surface that prevents the engaging device 3 from moving vertically upwards when it is in engagement with the hook 12. For this purpose, the engaging device 3 comprises an upper flange 27 at its engaging end (see for example FIG. 8*a*). The engaging device 3 comprises a piston 28 that moves in an axial direction, to which the upper flange 27 is rigidly fixed. The upper flange has, in addition, an upward-facing second support surface 27*a*. When the engaging device 3 is in engagement with the hook 12, this second support surface 27*a* is in contact with the second support surface 26 of the base unit 2. By this means, relative movement in an upward direction between the engaging device 3 and the base unit 2 is prevented when the engaging device 3 is in engagement with the hook 12 and the wheelchair is secured to the base unit.

In addition, the piston 28 of the engaging device 3 has a contact flange 29 on its end facing away from the engaging end (see FIG. 9*b*), which contact flange 29 meets with a contact sleeve 30 that is fixed in relation to the wheelchair. When the engaging device 3 is in the projecting position, the contact flange 29 is in contact with the contact sleeve 30 and prevents further withdrawal of the engaging device. By this means, the contact between the second support surface 27*a* of the engaging device 3 and the second support surface 26 of the base unit thus also prevents the wheelchair from moving in an upward direction in relation to the base unit 2.

In the docked position, a butt fixing of the wheelchair to the base unit is thus achieved in the vertical direction by means of the first and second support surfaces that interact in pairs.

As shown most clearly by FIGS. 7, 8*a-b* and 9*a-b* and as mentioned above, the engaging device 3 comprises a piston 20 that moves in an axial direction. A cylindrical, vertical tube 31 that forms a reinforcement of the chassis of the wheelchair is fixed to the chassis in such a way that it does not move, for example by welding. The contact sleeve 30 is arranged in the tube 31 and is fixed rigidly in this, in the vicinity of the lower end of the tube 31. The contact sleeve 30 has a central cylindrical opening. The opening comprises an upper part 30*a* with a larger diameter and a lower concentric part 30*b* with a smaller diameter. The diameter of the lower part corresponds essentially to the diameter of the piston 28. The upper end of the piston 28 and the contact flange 29, that is fixed to this end, by a screw, are arranged in the tube above the contact sleeve 30. A spiral spring 32 that urges the contact flange 29 in an upward direction is arranged around the piston and meets with a contact surface that is created in the contact sleeve 30 at the transition between the upper part 30*a* and lower part 30*b* of the opening.

An electrical operating device in the form of a solenoid 33 is arranged in the upper part of the tube 31. At its upper end, the solenoid 33 has a projecting flange 34 that meets with an upper ring-shaped end surface of the tube 31 and prevents the solenoid 33 from being moved axially in a downward direction. A stop plate 35, that is bolted onto the chassis in the vicinity of the upper end of the tube 31, is in contact with the top side of the solenoid 33 and prevents axial movement of the solenoid 33 in an upward direction. The solenoid 33 also has a shaft 36 that moves in an axial direction and projects when the solenoid 33 is activated electrically. The free end of the shaft 36 is in contact with the contact flange 29 that is attached to the piston 28 by a screw.

Figure 9A:
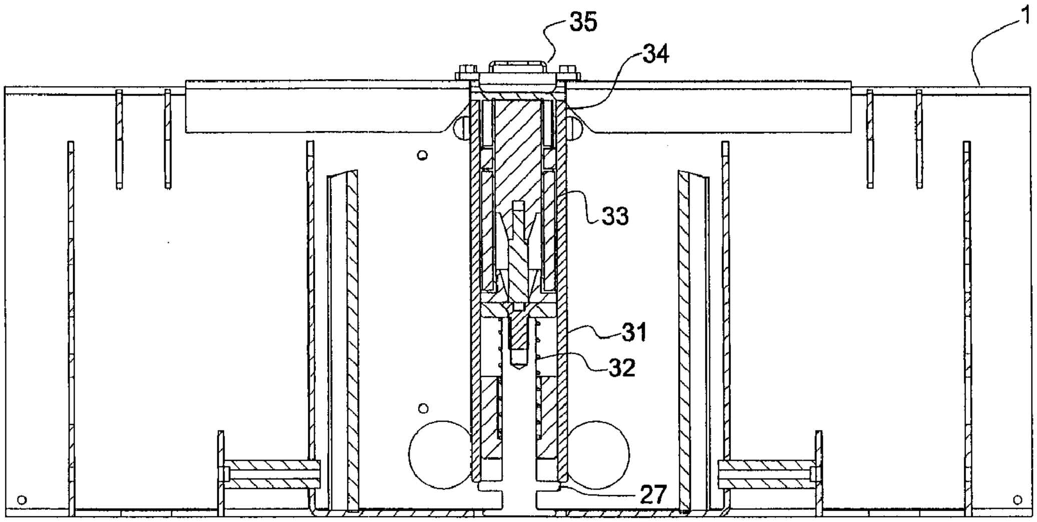
FIGS. 9*a* and 9*b* are cross sections through a part of a wheelchair and show the positions of the engaging device represented in FIGS. 8*a* and 8*b* respectively.
Figure 9B:
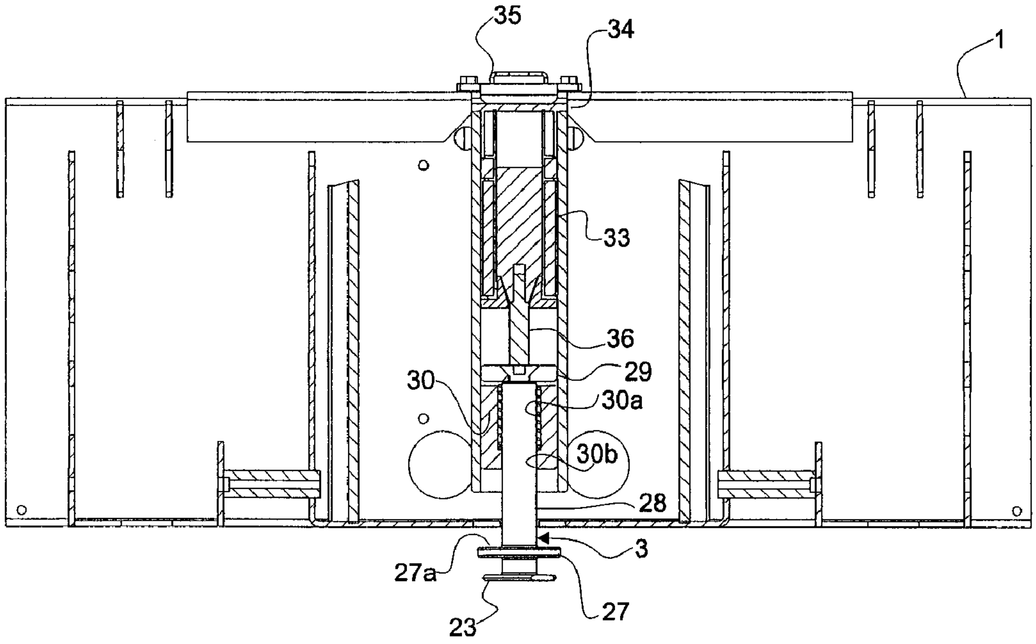

In the non-activated position shown in FIG. 9*a*, the solenoid 33 is not energized, with the result that the spring 32 urges the piston in an upward direction. The upper flange 27 of the engaging device thereby comes into contact with the lower ring-shaped end surface of the tube 31. When docking is to be carried out, the solenoid 33 is activated electrically, whereupon the shaft 36 projects and, by overcoming the spring force of the spring 32, pushes the piston in an outward direction, until the contact flange 29 meets with the upper end of the contact sleeve 30. The piston 28, and hence the engaging device 3 with the flange 27, have hereby assumed their projecting active positions and, as a result, by moving the wheelchair forward, the engaging device can be inserted into the slot 25 in the base unit 2 and can engage with the hook 12, whereupon the second support surface 27*a* of the flange 27 also comes into contact with the corresponding second support surface 26 of the base unit around the slot 25.

The electrical control equipment of the solenoid 33 is suitably arranged so that the solenoid 33 is kept energized for about 20 seconds from when it is activated by, for example, pressing an activating button that can be arranged on the armrest of the wheelchair. The engaging device is thereby held in its active position long enough to achieve the docking. At the same time, the solenoid, with its relatively high power consumption, does not need to be active for longer than necessary. If the docking is completed within 20 seconds, the solenoid can change to passive mode, with the engaging device being held in its projecting active position by the contact between the two sets of second support surfaces 26 and 27*a*. If, for some reason, the engaging device does not engage with the hook during the docking, detectors are suitably arranged on the base unit to detect that correct docking has not been achieved and to make the user aware of this in a suitable way.

In addition, in order to prevent damage to the solenoid, there is a relatively close fit between the lower part 30*b* of the opening of the contact sleeve 30 and the piston 28. If the projecting engaging device should encounter some obstacle and thereby be pressed upward, even though the solenoid is activated, this close fit brings about tilting and locking of the piston, which reduces the risk of the solenoid being damaged.

Exemplifying embodiments of the invention have been described above. The invention must not, of course, be regarded as being limited by this description, but can be varied freely within the framework of the following claims.

The invention claimed is:

1. A base unit (2) for docking and securing a wheelchair (1) having a suspension, in a secured position in a vehicle, which base unit is designed to be fixed to a floor of the vehicle and which base unit comprises;

a locking mechanism (11) for securing an engaging device (3) that is fixed to the wheelchair in such a way that it can be released;

at least one first support surface (20) facing away from the floor of the vehicle, the at least one first support surface (20) arranged to support a corresponding first support surface on the wheelchair in order to unload the suspension of the wheelchair and thereby to prevent the wheelchair from moving in a direction towards the floor of the vehicle when in the secured position; and a lifting device comprising at least one rotating device (22) with a circular peripheral support surface, which lifting device is arranged to raise the first support surface of the wheelchair to be on a level with the first support surface (20) of the base unit when the wheelchair with its first support surface moves in a direction towards the first support surface of the base unit during docking.

2. The base unit according to claim 1, comprising at least one second support surface (26) facing in an opposite direction to the first support surface (20), which second support surface (26) is arranged to make contact with a corresponding second support surface (27*a*) on the engaging device (3) in order to prevent the wheelchair (1) from moving in a direction away from the floor of the vehicle when in the secured position.

3. The base unit according to claim 1, comprising a casing (4) that holds the locking mechanism (11), which casing comprises an upper wall with a first side facing the floor of the vehicle and a second side facing away from the floor of the vehicle, wherein said first side comprises said first support surface (20) of the base unit and said second side comprises said second support surface (26) of the base unit.

4. The base unit according to claim 3, comprising two first support surfaces (20) that are essentially parallel with each other and with the floor of the vehicle, which first support surfaces (20) are arranged on or in the vicinity of opposite side edges of the upper wall (5) of the casing.

5. The base unit according to claim 4, in which the first support surfaces of the base unit (1) are each arranged on facing plates (21) that are fixed to a top side of the upper wall (5) of the casing.

6. The base unit according to claim 2, in which the second support surface (26) of the base unit (2) is arranged around a slot (25) in an upper wall that is arranged to receive the engaging device (3).

7. A system for securing a wheelchair in a secure position in a vehicle, which system comprises;

a wheelchair (1) with a suspension and an engaging device (3) fixed to the wheelchair; and a base unit (2) that is designed to be fixed to a floor of the vehicle, wherein;

the base unit comprises a locking mechanism (11) for securing the engaging device in such a way that it can be released and at least one first support surface (20) facing away from the floor of the vehicle;

the wheelchair comprises a first support surface interacting with the first support surface of the base unit; and the first support surface of the base unit is arranged to support the first support surface of the wheelchair in order to unload the suspension of the wheelchair and thereby prevent the wheelchair from moving in a direction towards the floor of the vehicle when in the secure position; and wherein the base unit comprises a lifting device comprising at least one rotating device (22) with a circular peripheral support surface, which lifting device is arranged to raise the first support surface of the wheelchair to be on a level with the first support surface (20) of the base unit by making contact with the wheelchair (1) when the wheelchair with its first support surface moves in a direction towards the first support surface of the base unit during docking.

8. The system according to claim 7, wherein the base unit (2) comprises at least one second support surface (26) facing away from the at least one first support surface of the base unit; the engaging device (3) has a corresponding second support surface (27*a*); and the second support surface of the base unit and the second support surface of the engaging device are arranged to be in contact with each other in order to prevent the wheelchair from moving in a direction away from the floor of the vehicle when in the secure position.

9. The system according to claim 8, wherein, in the secure position, a distance between the at least one first support surface (20) of the base unit and the at least one second (26) support surface of the base unit is essentially the same size as a distance between the first support surface of the wheelchair and the second support surface (27*a*) of the engaging device.

10. A base unit (2) for docking and securing a wheelchair (1) having a suspension, in a secured position in a vehicle, which base unit is designed to be fixed to a floor of the vehicle and which base unit comprises;

a locking mechanism (11) for securing an engaging device (3) that is fixed to the wheelchair in such a way that it can be released;

at least one first support surface (20) facing away from the floor of the vehicle, the at least one first support surface (20) arranged to support a corresponding first support surface on the wheelchair in order to unload the suspension of the wheelchair and thereby to prevent the wheelchair from moving in a direction towards the floor of the vehicle when in the secured position; and a lifting device comprising a slide surface sloping downwards from the first support surface of the base unit towards the floor of the vehicle, which lifting device is arranged to raise the first support surface of the wheelchair to be on a level with the first support surface (20) of the base unit by making contact with the wheelchair (1) when the wheelchair with its first support surface moves in a direction towards the first support surface of the base unit during docking.

11. A system for securing a wheelchair in a secure position in a vehicle, which system comprises;

a wheelchair (1) with a suspension and an engaging device (3) fixed to the wheelchair; and a base unit (2) that is designed to be fixed to a floor of the vehicle, wherein;

the base unit comprises a locking mechanism (11) for securing the engaging device in such a way that it can be released and at least one first support surface (20) facing away from the floor of the vehicle;

the wheelchair comprises a first support surface interacting with the first support surface of the base unit; and the first support surface of the base unit is arranged to support the first support surface of the wheelchair in order to unload the suspension of the wheelchair and thereby prevent the wheelchair from moving in a direction towards the floor of the vehicle when in the secure position; and wherein the base unit comprises a lifting device comprising a slide surface sloping downwards from the first support surface of the base unit towards the floor of the vehicle, which lifting device is arranged to raise the first support surface of the wheelchair to be on a level with the first support surface (20) of the base unit by making contact with the wheelchair (1) when the wheelchair with its first support surface moves in a direction towards the first support surface of the base unit during docking.

* * * * *